United States Patent
Miyamoto et al.

[11] Patent Number: 6,165,073
[45] Date of Patent: Dec. 26, 2000

[54] VIDEO GAME APPARATUS AND MEMORY MEDIUM THEREFOR

[75] Inventors: Shigeru Miyamoto; Yoshiaki Koizumi; Toru Osawa; Yoichi Yamada; Toshio Iwawaki; Tsuyoshi Kihara, all of Kyoto, Japan

[73] Assignee: Nintendo Co., Ltd., Kyoto, Japan

[21] Appl. No.: 09/179,954

[22] Filed: Oct. 28, 1998

[30] Foreign Application Priority Data

Oct. 30, 1997 [JP] Japan .................................. 9-298111

[51] Int. Cl.$^7$ ..................................................... A63F 13/00
[52] U.S. Cl. ............................... 463/32; 463/33; 463/31; 463/1; 463/43
[58] Field of Search .............................. 463/30–33, 43, 463/44, 47, 1, 2, 5, 49, 53, 54

[56] References Cited

U.S. PATENT DOCUMENTS 5,830,066  11/1998  Goden et al. .............................. 463/33
5,947,823  9/1999  Nimura ..................................... 463/32
5,973,704  10/1999  Nishiumi et al. ....................... 245/475
6,017,271  1/2000  Miyamoto et al. ...................... 463/31

FOREIGN PATENT DOCUMENTS

0869458A2  10/1998  European Pat. Off. ........ G06T 15/10

*Primary Examiner*—Jessica J. Harrison
*Assistant Examiner*—Julie Kasick
*Attorney, Agent, or Firm*—Nixon & Vanderhye P.C.

[57] ABSTRACT

A video game apparatus includes an RCP. The RCP performs a conversion process on image data to display a player object or non-player object according to image data transferred from an external ROM to a RAM, and supplies the image signal through the display. The RCP detects whether or not there exists a non-player object at around the player object on the display in response to an operation of a Z button. If a non-player object is detected, the RCP selects the non-player object as an attention non-player object. At this time, the hypothetical camera is changed in position and photographing direction such that photographing can be made for the player object directly facing the non-player object.

52 Claims, 16 Drawing Sheets

DETAIL OF IMAGE DATA AREA 203

VIDEO GAME APPARATUS AND MEMORY MEDIUM THEREFOR

BACKGROUND OF THE INVENTION

1. Field of the invention

This invention relates to a video game apparatus and a memory medium used therefor. More particularly, the invention relates to a video game apparatus and memory medium adapted to display the player object and non-player object in a three-dimension virtual space of a display unit.

2. Description of the Prior Art

The three-dimension video game apparatuses, e.g., "Nintendo 64 (registered trademark)", are adapted to display a player object and non-player object in a three-dimension virtual space of a display unit. With such a three-dimension game apparatus, the player object (player object: object that the player can move in desired directions or make desired motions. Abbreviation "PO" may hereinafter be used) can be moved in arbitrary directions in the three-dimension space through operator's manipulation of the direction instructing means, such as an analog joystick, provided on the controller.

In the three-dimension space, the player object moves in three X, Y and Z axial directions in response to operation of the direction instructing means. However, it is significantly difficult for the player to precisely control, the direction of movements or a line of vision (fully or directly facing direction) of the player object by using the direction instructing means. For example, when shooting an arrow at a non-player object (non-player object: object that moves in directions according to a program or make motions according to the program, irrespectively of operation of the controller by the player. Abbreviation "NPO" may hereinafter be used) such as an enemy character, the player object has to be directed full facing the enemy character. In such a case, it is impossible to get a direct damaging hit on the enemy character by the arrow unless the direction of the player object is under exact control.

SUMMARY OF THE INVENTION

Therefore, it is a primary object of the present invention to provide a video game apparatus which can easily set the player object so as to pay attention to the non-player object.

It is another object of the present invention to provide a video game apparatus which can set the player object performing required movements while maintaining a state wherein the player object is paying attention to the non-player object.

The present invention is a video game apparatus coupled to a display, including: a first image data generating means for generating first image data to display a player object; a second image data generating means for generating second image data to display non-player objects; an image processing means for supplying an image signal to the display according to at least one of the first image data and the second image data in order to display, in a virtual three-dimension space on the display, at least one of the player object and the non-player object photographed through a hypothetical camera; a controller means including a first operating means to instruct a moving direction of the player object and a second operating means that is operated when attention is to be paid by the player object to the non-player object; a non-player object detecting means for detecting whether the non-player object exists or not, in response to an operation of the second operating means; a selecting means for selecting as an attention non-player object the non-player object detected by the non-player object detecting means; and a camera control means for changing in position of the hypothetical camera such that photographing can be made on the player object directly facing the attention non-player object selected by the selecting means.

The image processing means performs transforming processes (coordinate transformation and frame memory rendering) to display a player object or non-player object according to the first image data and second image data transferred from an external ROM to a RAM, and supplies a resulting image signal to the display. The non-player object detecting means detects whether or not the non-player object exists around the player object on the display, in response to operation of a second operating, e.g., a Z button, included in the controller means. If the non-player object detecting means detects a non-player object, the selecting means select the non-player object as an attention non-player object. If at this time a plurality of non-player objects are detected, the selection means selects the non-player objects according to a priority order. When one non-player object is selected as an attention non-player object, the camera control means shifts in position and direction of photographing so that the player object facing the attention non-player object can be photographed. Specifically, the non-player object and the player object are entered within a range of display with respect to a location that is close to a line connected between the respective centers of the attention non-player object and the player object and behind the player object.

The non-player object detecting means detects not only the non-player object displayed on the display, but also the non-player object that is existing but not being displayed due to the hypothetical camera photographing position or direction.

Where a lock means is provided, when moving the player object by the direction instructing means, the player object is moved while paying attention to the non-player object.

According to the present invention, the operation of the second operating means by a player readily sets the player object paying attention to the non-player object, thus drastically improving game operation. When the player object is locked to the attention non-player object by the lock means, it is possible to easily cause the player object to follow the non-player object, for example, in cases where the player object battles with the non-player object. Accordingly, where the non-player object is an enemy object, it is possible to cause direct damage to that object.

Also, according to the present invention, the non-player object not currently being displayed on the display can readily be found by operating the second operating means.

The above described objects and other objects, features, aspects and advantages of the present invention will become more apparent from the following detailed description of the present invention when taken in conjunction with the accompanying drawings.

DETAILED DESCRIPTION OF ONE PREFERRED EMBODIMENT

Figure 1:
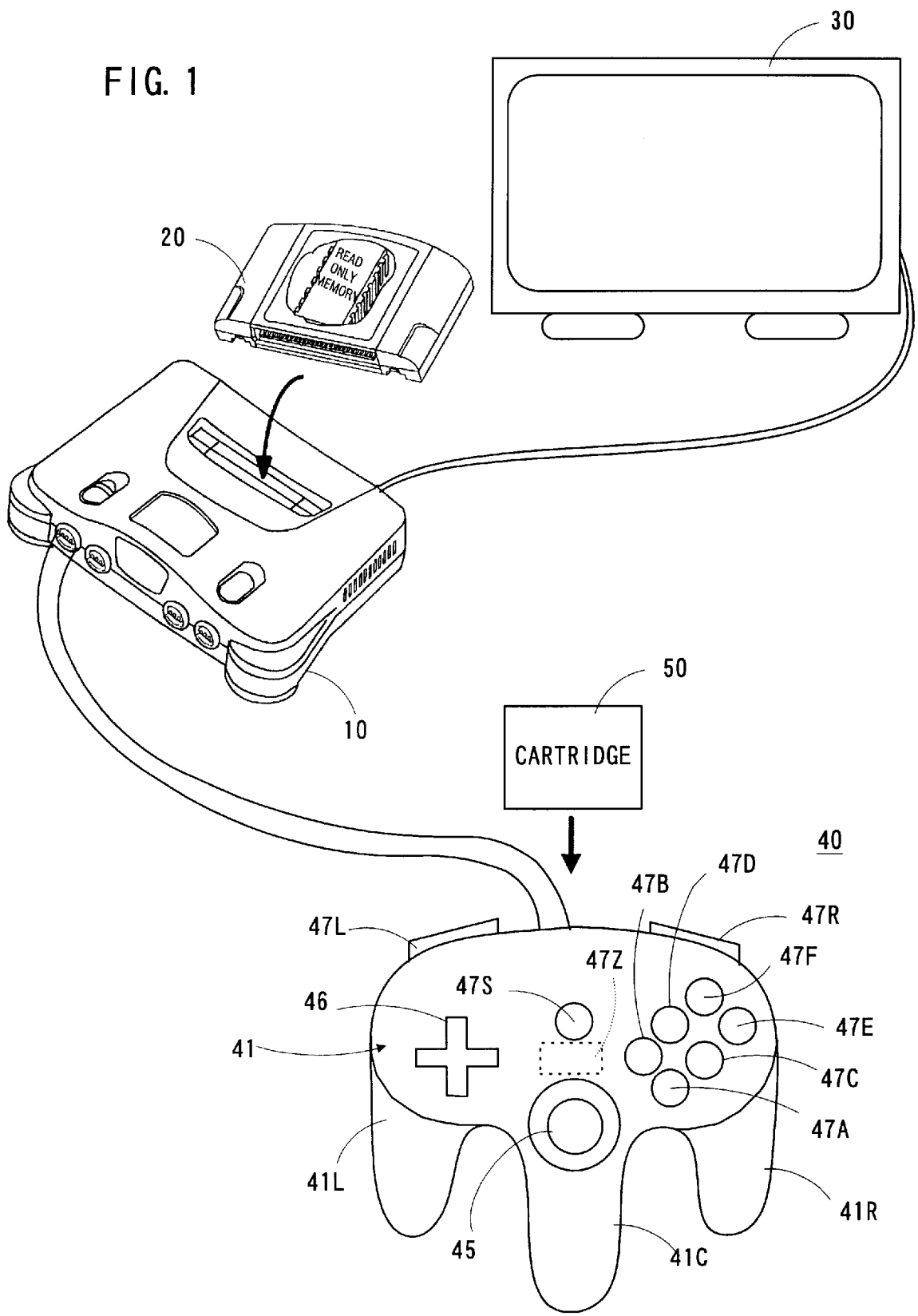
FIG. 1 is a schematic illustrative view showing a video game system according to one embodiment of the present invention.

Referring to FIG. 1, a video game system in this embodiment includes a video game machine 10, a ROM cartridge 20 as one example of a memory medium, a display unit 30 connected to the video game machine 10, and a controller 40. The controller 40 includes a removable with a cartridge 50.

The controller 40 includes a plurality of switches or buttons provided on the housing 41 in a form graspable by both or one hand. Specifically, the controller 40 includes handles 41L, 41C, 41R downwardly extending respectively from a left end, a right end and a center of the housing 41, providing an operation area on a top surface of the housing 41. In the operation area, there are provided an analog-inputtable joystick (hereinafter referred to as "analog joystick") 45 at a central lower portion thereof, a cross-shaped digital direction switch (hereinafter called "cross switch") 46 on the left side, and a plurality of button switches 47A, 47B, 47D, 47E and 47F on the right side.

The analog joystick 45 is used to input moving directions and/or moving speeds or moving amounts of the player object as determined by an amount and direction of joystick inclination. The cross switch 46 is used to designate a moving direction of the player object, in place of the joystick 45. The button switches 47A and 47B are used to designate a motion of the player object. Button switches 47C–47D are used to switch over a visual point of a three-dimension image camera or adjust speed or the like of the player object.

A start switch 47S is provided almost at a center of the operation area. This start switch 47S is operated when starting a game. A switch 47Z is provided at a backside of the central handle 41C. This switch 47Z is utilized, for example, as a trigger switch in a shoot game. This switch (may be hereinafter called "Z botton") 47Z is operated when the player object is to be caused to pay attention to a non-player object. That is, this switch 47Z functions as a second operating means. Switches 47L and 47R are provided at upper left and right of a lateral surface of the housing 41.

Incidentally, the above-stated button switches 47C–47F can also be used to control the moving speed (e.g. acceleration or deceleration) of the player object in a shoot or action game, besides for the purpose of switching the camera visual point. However, these switches 47A–47F, 47S, 47Z, 47L and 47R can be arbitrarily defined in their function depending upon a game program.

Figure 2:
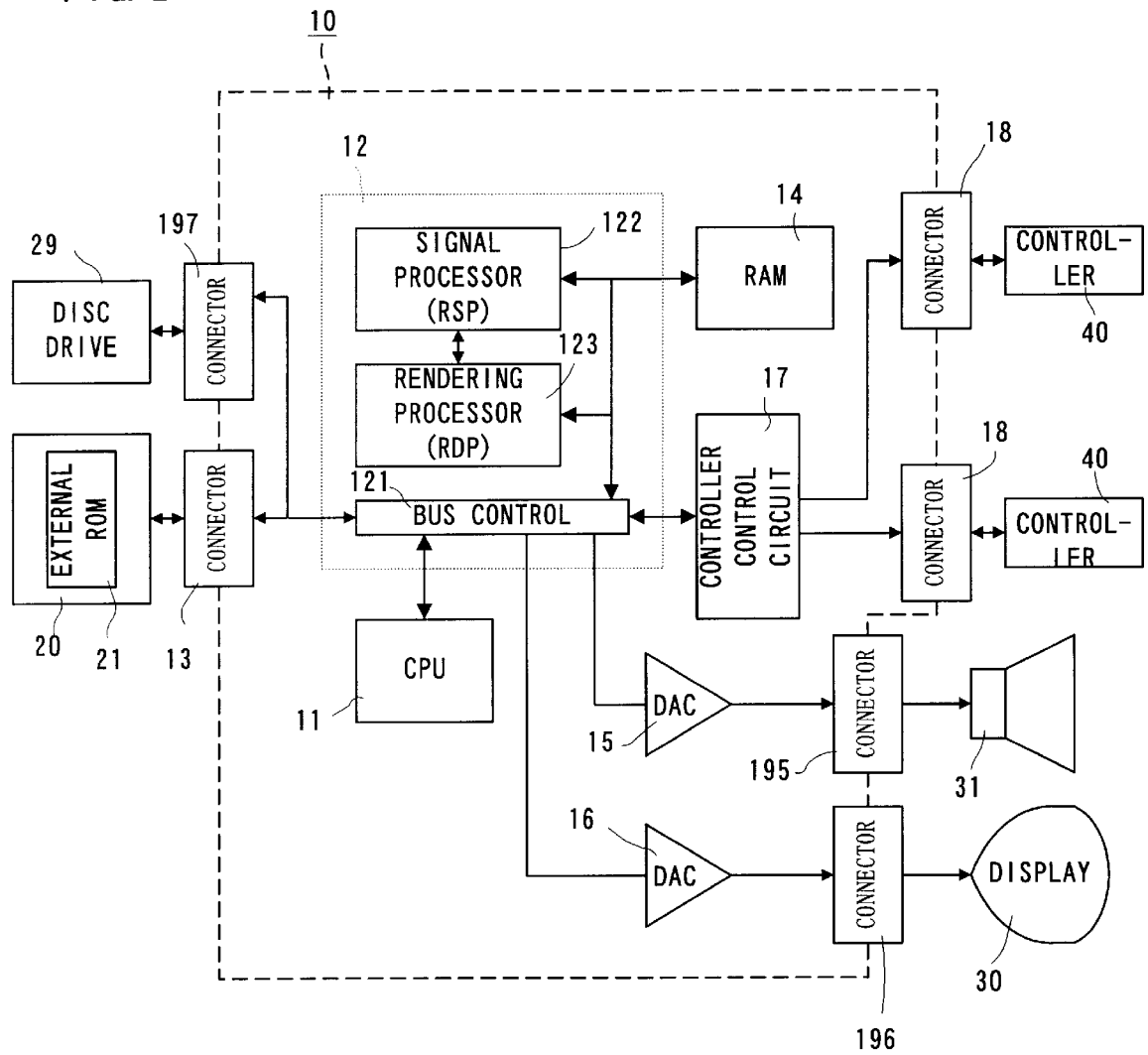
FIG. 2 is a block diagram showing in detail a video game machine in FIG. 1.

FIG. 2 is a block diagram of the video game system of the FIG. 1 embodiment. The video game machine 10 incorporates therein a central processing unit (hereinafter referred to as "CPU") 11 and a coprocessor (reality coprocessor: hereinafter referred to as "RCP") 12. The RCP 12 includes a bus control circuit 121 for controlling buses, a signal processor (reality signal processor; hereinafter referred to as "RSP") 122 for performing polygon coordinate transformation, shading treatment and so on, and a rendering processor (reality display processor; hereinafter referred to as "RDP") 46 for rasterizing polygon data into an image to be displayed and converting the same into a data form (dot data) memorable on a frame memory.

The RCP 12 is connected with a cartridge connector 13 for unloadably loading a ROM cartridge 20 having an external ROM 21 incorporated therein, a disc-drive connector 197 for detachably mounting a disc drive 29, and a RAM 14. Also, the RCP 12 is connected with DAC (Digital/Analog Converters) 15 and 16 for respectively outputting a sound signal and video signal to be processed by the CPU 11. Further, the RCP 12 is connected with a controller control circuit 17 to serially transfer operating data on one or a plurality of controllers 40 and/or data of the cartridge 50.

The bus control circuit 121 included in the RCP 12 performs parallel/serial conversion on a command supplied in a parallel signal from the CPU via a bus, to thereby supply a serial signal to the controller control circuit 18. Also, the bus control circuit 121 converts a serial signal inputted from the controller control circuit 17 into a parallel signal, giving an output to the CPU 11 via the bus. The data representative of an operating state (operating signal or operating data) read out of the controller 40A–40D is processed by the CPU 11, and temporarily stored within a RAM 14, and so on. In other words, the RAM 15 includes a storage site for temporarily memorizing the data to be processed by the CPU 11, so that it is utilized for smoothly reading and writing data through the bus control circuit 121.

The sound DAC 15 is connected with a connector 195 provided at a rear face of the video game machine 10. The image DAC 16 is connected with a connector 196 provided at the rear face of the video game machine 10. The connector 195 is connected with a speaker 31 of a display 30, while the connector 196 is connected with a display 30 such as a TV receiver or CRT.

The controller control circuit 17 is connected with a controller connector provided at the front face of the video game machine 10. The connector 18 is disconnectably connected by a controller 40 through a connecting jack. The connection of the controller 40 to the connector 18 places the controller in electrical connection to the video game machine 10, thereby enabling transmission/reception or transfer of data therebetween.

Figure 3:
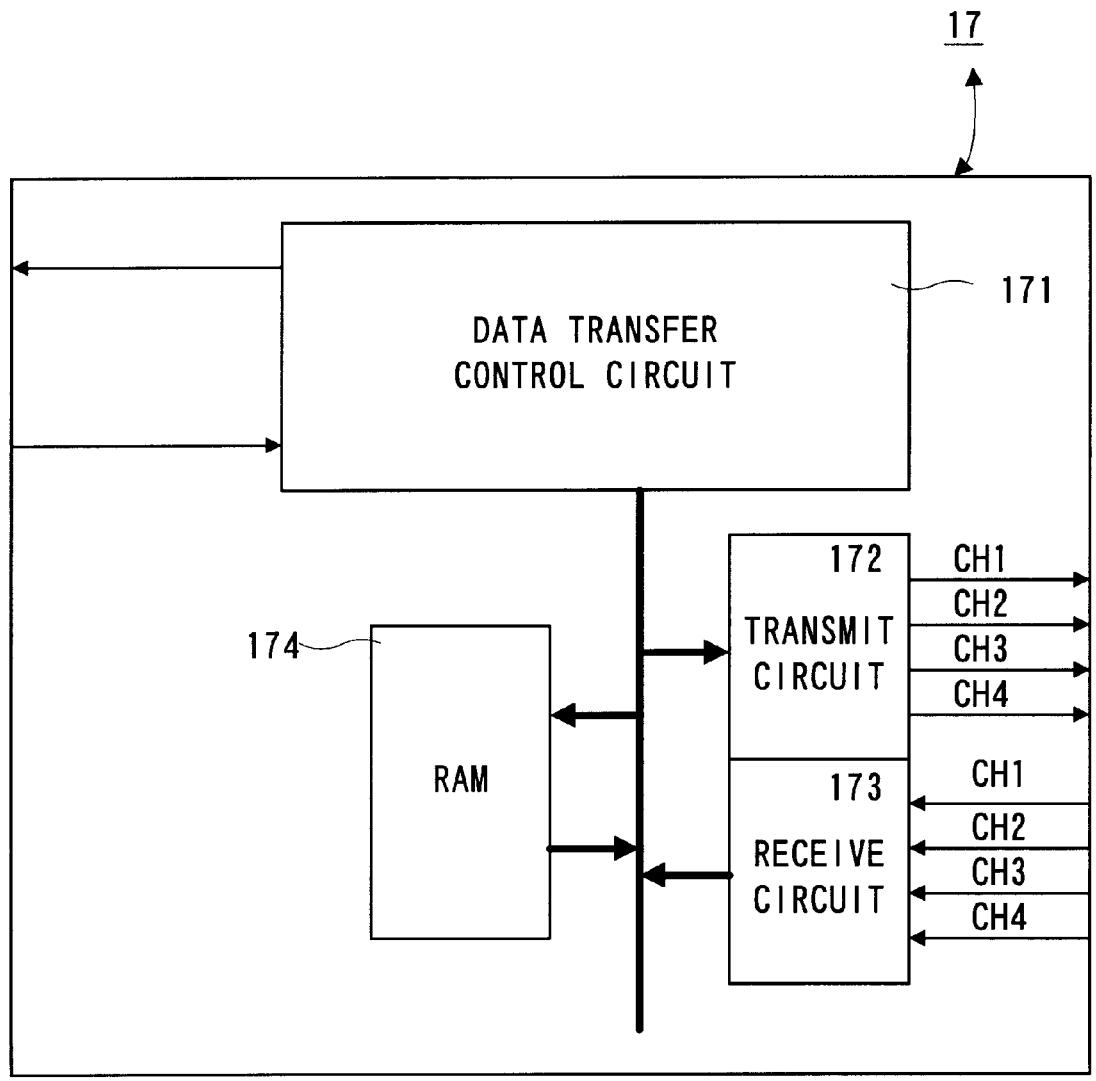
FIG. 3 is a block diagram showing in detail a controller control circuit in FIG. 2.

The controller control circuit 17 is used to transmit and receive data in serial between the RCP 12 and the connector 18. The controller control circuit 17 includes, as shown in FIG. 3, a data transfer control circuit 171, a transmitting circuit 172, a receiving circuit 173 and a RAM 174 for temporarily memorizing tansmission and reception data. The data transfer control circuit 171 includes a parallel/serial converting circuit and a serial/parallel converting circuit in order to convert a data format during data transfer, and further performs write/read control on the RAM 174. The serial/parallel converting circuit converts the serial data supplied from the RCP 12 into parallel data, supplying it to the RAM 174 or the transmitting circuit 172. The parallel/serial converting circuit converts the parallel data supplied from the RAM 174 or the receiving circuit 173 into serial data, to supply it to the RCP 12. The transmitting circuit 172 converts the command for reading signals from the controller 40 and the writing data (parallel data) to the cartridge 50, into serial data to be delivered to channels CH1–CH4 corresponding to the respective controllers 40. The receiving circuit 173 receives, in serial data, operational state data of the controllers inputted through corresponding channels CH1–CH4 and data read from the cartridge 50, to convert them into parallel data to be delivered to the data transfer control circuit 171. The data transfer control circuit 171 writes into the RAM 174 data transferred from the RCP 12, data of the controller received by the receiving circuit 183, or data read out of the RAM cartridge 50, and reads data out of the RAM 174 based on a command from the RCP 12 so as to transfer it to the RCP 12.

The RAM 174, though not shown, includes memory sites for the respective channels CH1–CH4. Each of the memory sites is stored with a command for the channel, transmitting data and/or reception data.

Figure 4:
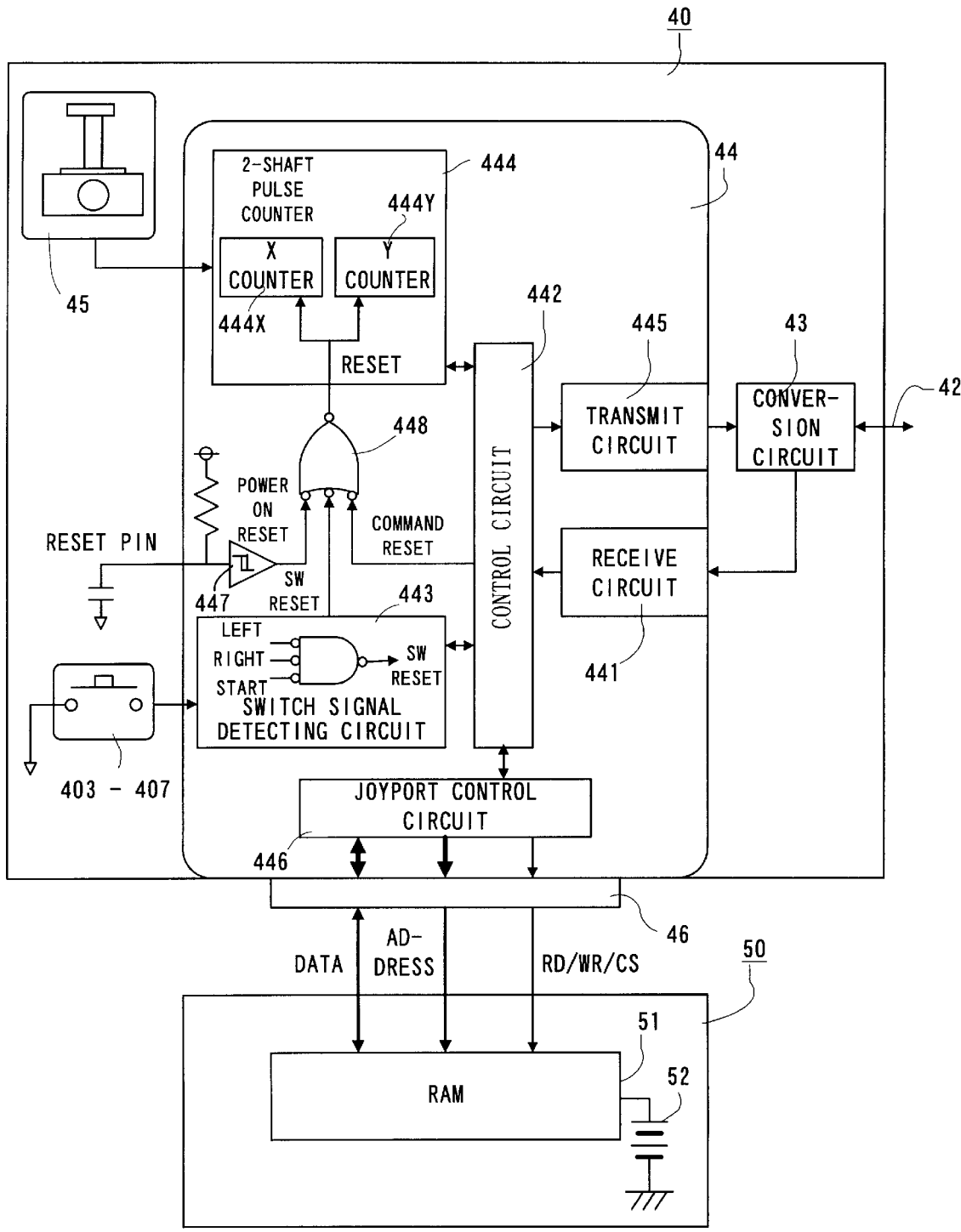
FIG. 4 is a block diagram showing in detail a controller and cartridge in FIG. 1.

FIG. 4 is a detailed circuit diagram of the controller 40 and the cartridge 50. The housing of the controller 40 incorporates an operating signal processing circuit 44, etc. in order to detect an operating state of the joystick 45, switches 46, 47, etc. and transfer the detected data to the controller control circuit 17. The operating signal processing circuit 44 includes a receiving circuit 441, a control circuit 442, a switch signal detecting circuit 443, a counter circuit 444, a joyport control circuit 446, a reset circuit 447 and a NOR gate 448. The receiving circuit 441 converts a serial signal, such as a control signal transmitted from the controller control circuit 17 or writing data to the cartridge 50, into a parallel signal to supply it to the control circuit 442. The control circuit 442 generates a reset signal to reset (0), through the NOR gate 448, count values of an X-axis counter 444X and a Y-axis counter 444Y within the counter 444, when the control signal transmitted from the controller control circuit 17 is a signal for resetting X, Y coordinates of the joystick 45.

The joystick 45 includes X-axis and Y-axis photo-interrupters in order to decompose a lever inclination into X-axis and Y-axis components, generating pulses in number proportional to the inclination. The pulse signals are respectively supplied to the counter 444X and the counter 444Y. The counter 444X counts a number of pulses generated in response to an inclination amount when the joystick 45 is inclined in the X-axis direction. The counter 444Y counts a number of pulses generated responsive to an inclination amount when the joystick 45 is inclined in the Y-axis direction. Accordingly, the resultant X-axis and Y-axis vector determined by the count values of the counters 444X and 444Y serves to determine a moving direction and a coordinate position of the player object or hero character or a cursor. Incidentally, the counter 444X and the 444Y are reset, when a reset signal is supplied from the reset signal generating circuit 447 upon turning on the power or a reset signal is supplied from the switch signal detecting circuit 443 by simultaneous depression of predetermined two switches.

The switch signal detecting circuit 443 responds to a switch-state output command supplied at an interval of a constant period (e.g. a 1/30 second interval as a TV frame period) from the control circuit 442, to read a signal varying depending upon a depression state of the cross switch 46 and the switches 47A–47Z. The read signal is delivered to the control circuit 442. The control circuit 442 responds to a read-out command signal of operational state data from the controller control circuit 17 to supply in a predetermined data format the operational state data on the switches 47A–47Z and count values of the counters 444X and 444Y to the transmitting circuit 445. The transmitting circuit 445 converts the parallel signal outputted from the control circuit 442 into a serial signal, and transfer it to the controller control circuit 17 via a converting circuit 43 and a signal line 42. The control circuit 442 is connected with a joystick control circuit 446 via an address bus and a data bus as well as a port connector 46. The joyport control circuit 446 performs data input/output (or transmission/reception) control according to a command from the CPU 11 when the cartridge 50 is connected to the port connector 46.

The cartridge 50 is structured by connecting the RAM 51 to the address bus and data bus and connecting the RAM 51 with a battery 52. The RAM 51 is a RAM having a capacity (e.g. 256 k bits), for example, of lower than a half of a maximum memory capacity accessible through the address bus. The RAM 51 is to store backup data in relation to a game, and saves backup data by the application of electric power from the battery 52 even if the cartridge 50 is withdrawn from the port connector 46.

Figure 5:
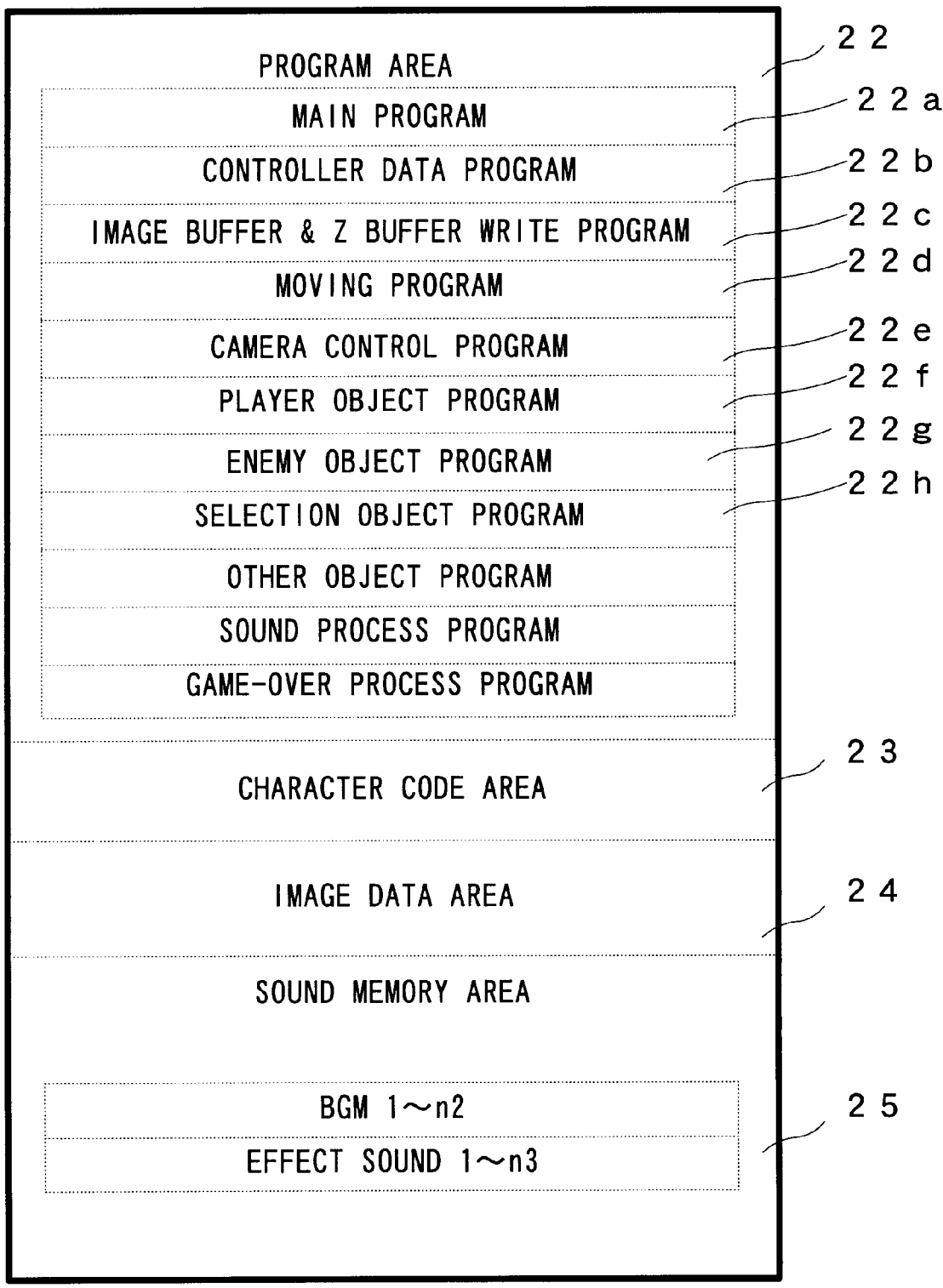
FIG. 5 is an illustrative view showing a memory map of an external ROM in FIG. 2.

FIG. 5 is a memory map showing a memory space of the external ROM 21 incorporated in the ROM cartridge 20 (FIG. 1). The external ROM 21 includes a plurality of memory areas (hereinafter referred to merely as "area"), for example, such as a program area 22, a character code area 23, an image data area 24 and a sound memory area 25, as shown in FIG. 5, thereby previously storing various program in a fixed manner.

The program area 22 is stored with programs required to process game images, and game data and the like in accordance with a game content. Specifically, the program area 22 includes a plurality of memory areas to store operating programs for the CPU 11 in a fixed manner. A main program area 22*a* is stored with a main routine processing program, for example, for a game shown in FIG. 8 below. A controller data program area 22*b* is stored with a program for processing operational data on the controller 40. A write program area 22*c* is stored with a write program by which the CPU 11 causes the RCP 12 to perform writing into a frame memory and Z buffer. For example, the write program area 22*c* is stored with a program to write, into an image data area 203 (FIG. 6) of the RAM 14, chrominance data as image data based on texture data for a plurality of movable objects or background objects to be displayed in one background scene. A move program area 22*d* is stored with a control program by which the CPU 11 causes the RCP 12 to vary the position of a moving body in a three-dimension space. A camera control program area 22*e* is stored with a camera control program that controls as to in which direction and/or position the movable objects including player object or the background objects are to be photographed in the three-dimension space. A player object program area 22*f* is stored with a program that controls display of an object operated by the player. An enemy object program area 22g is stored with a program that controls display of an enemy object to make attacking on the player object. A selection object program area 22h is stored with a program to display a selection object at a location close to the non-player object to which the player object pays attention when the above-mentioned Z button 47Z is depressed.

The character code area 23 is an area to store a plurality of kinds of character codes, e.g. a plurality of kinds of character dot data corresponding to codes. The character code data stored in the character code area 23 is utilized to display an instructing text to the player in the process of a game.

An image data area 24 is stored with image data, such as coordinate data of a plurality of polygons for each of the background object and/or movable objects, and texture data, and also a display control program to display these objects stationary at a predetermined position or in a moving state.

A sound memory area 25 is stored with sound data, such as phrases for outputting in sound the above message, effect sounds, game musics (BGM), etc., in a manner appropriate for a scene.

Incidentally, the memory medium or external memory device may use various kinds of memory mediums, such as CD-ROMs or magnetic discs, in place of or in addition to the ROM cartridge 20. In such a case, a disc drive 29 (FIG. 2) is provided in order to read or write, if required, various data (including program data and data for image presentation) for a game from or onto an optical or magnetical disc memory medium such as a CD-ROM or magnetic disc. The disc drive 29 reads data out of a magnetic disc or optical disc stored program data similarly to the external ROM 21, and transfer the same data to the RAM 14.

Figure 6:
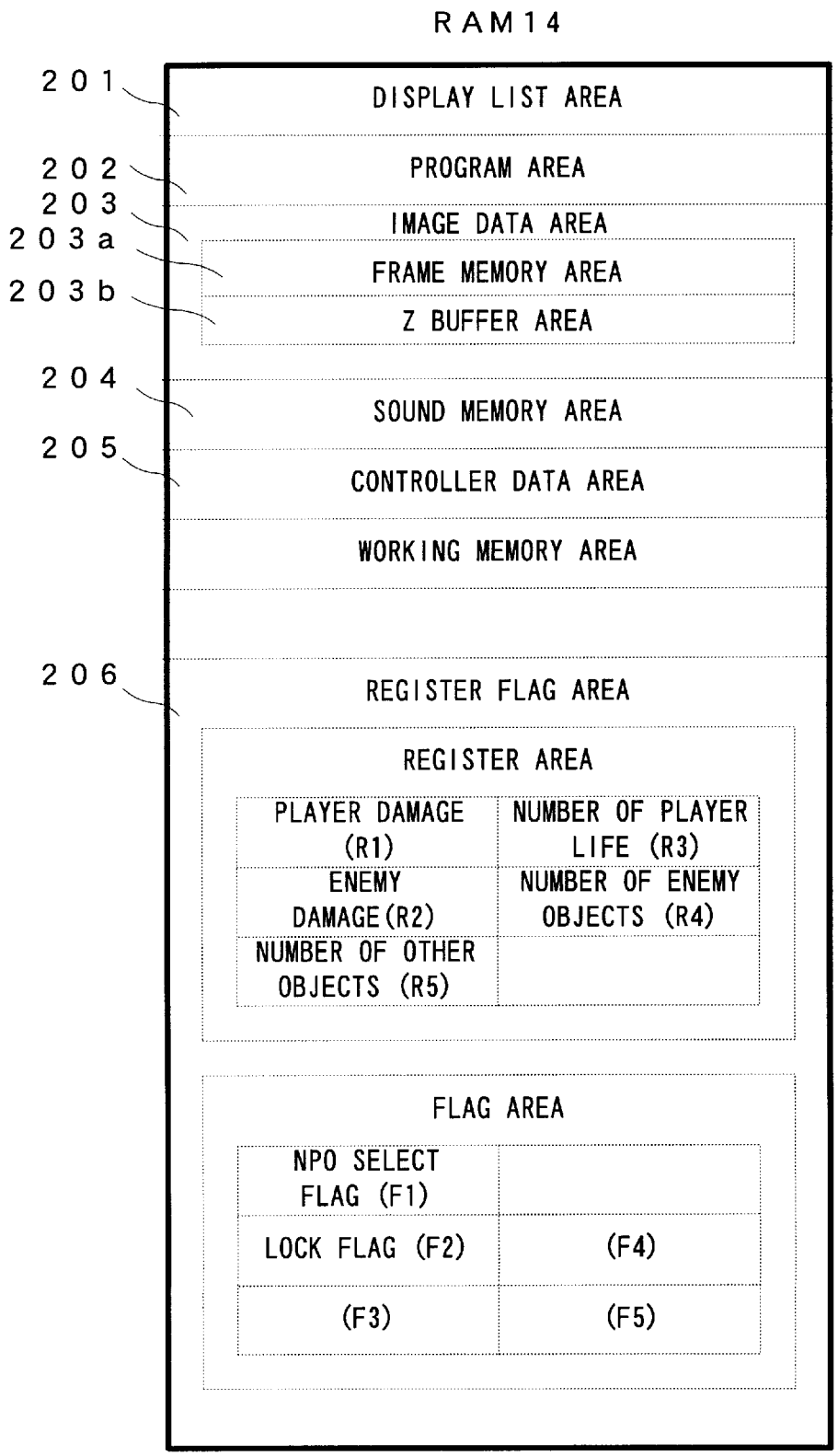
FIG. 6 is an illustrative view showing a memory map of a RAM in FIG. 2.
Figure 7:
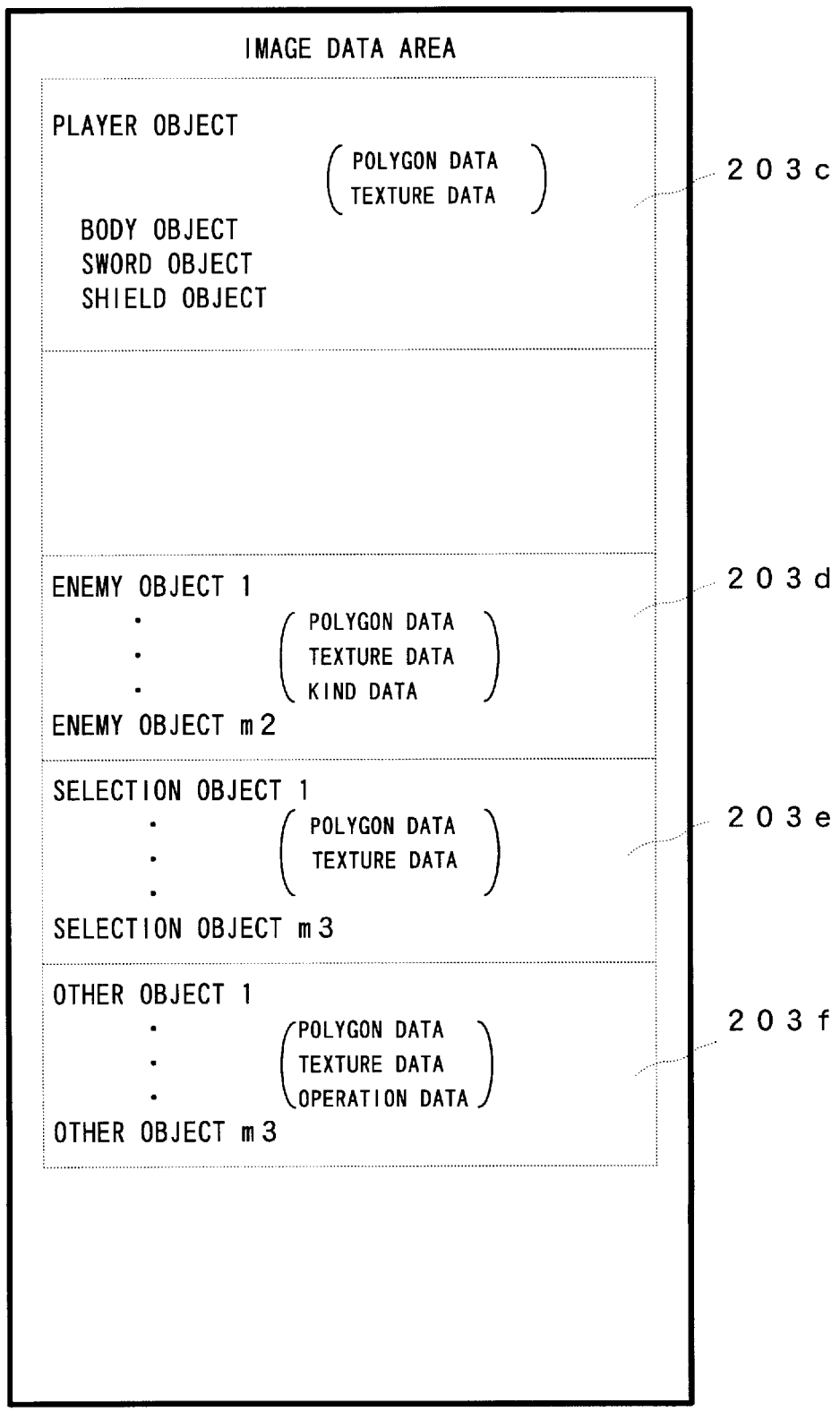
FIG. 7 is an illustrative view showing in detail image data area contained in the RAM of FIG. 6.

FIG. 6 is a memory map illustrative of a memory space of the RAM 14. The RAM 14 includes a display list area 201. When the player object or the non-player object is to be displayed, its object No. is registered in the display list area 201. The RAM 14 includes further a program area 202 and an image data area 203. The image data area 203 includes a frame memory area 203a to temporarily memorize 1 frame of image data, and a Z buffer area 203b to memorize, dot by dot, depth data of the frame memory area. The image data area 203 further includes, as shown in FIG. 7, a player object image data area 203c, an enemy object image data area 203d, a selection object image data area 203e and other object image data area 203f. Each of the areas 203c–203f temporarily memorizes polygon data or texture data. The program data area 202 is to temporarily memorize a program. The program data given on each area of the ROM 21 (FIG. 5) is temporarily memorized, as required, in the program data area 202. The CPU 11 and the RCP 12 (FIG. 2) make access to the program area thereby putting the game forward. Similarly, the image data area 203 is to temporarily memorize, as required, the image data stored in the ROM 21, which is directly accessible by the CPU 11 or the RCP 12. That is, the image data area 203 memorizes coordinate data and texture data for a plurality of polygons to constitute a stationary object and/or movable object stored, for game image display, in the external ROM 21, to which 1 course or stages of data is transferred, prior to image processing, from the external ROM 21.

A sound memory area 204 temporarily memorizes sound data of BGM or effect sound given on the sound memory area 25 of the ROM 21, as shown in FIG. 5. A controller data memory area 205 temporarily memorizes operation status data indicative of an operation status read out through the controller 40.

Also, a flag register area 206 sets, as required, a flag during execution of a program by the CPU 11, or memorizes a variable or constant. The flags to be set in this flag register area 206 involve a flag F1 representative of whether a non-player object has already been selected as attention non-player object or not, and a flag F2 representative of whether the non-player object is locked or not.

Figure 8:
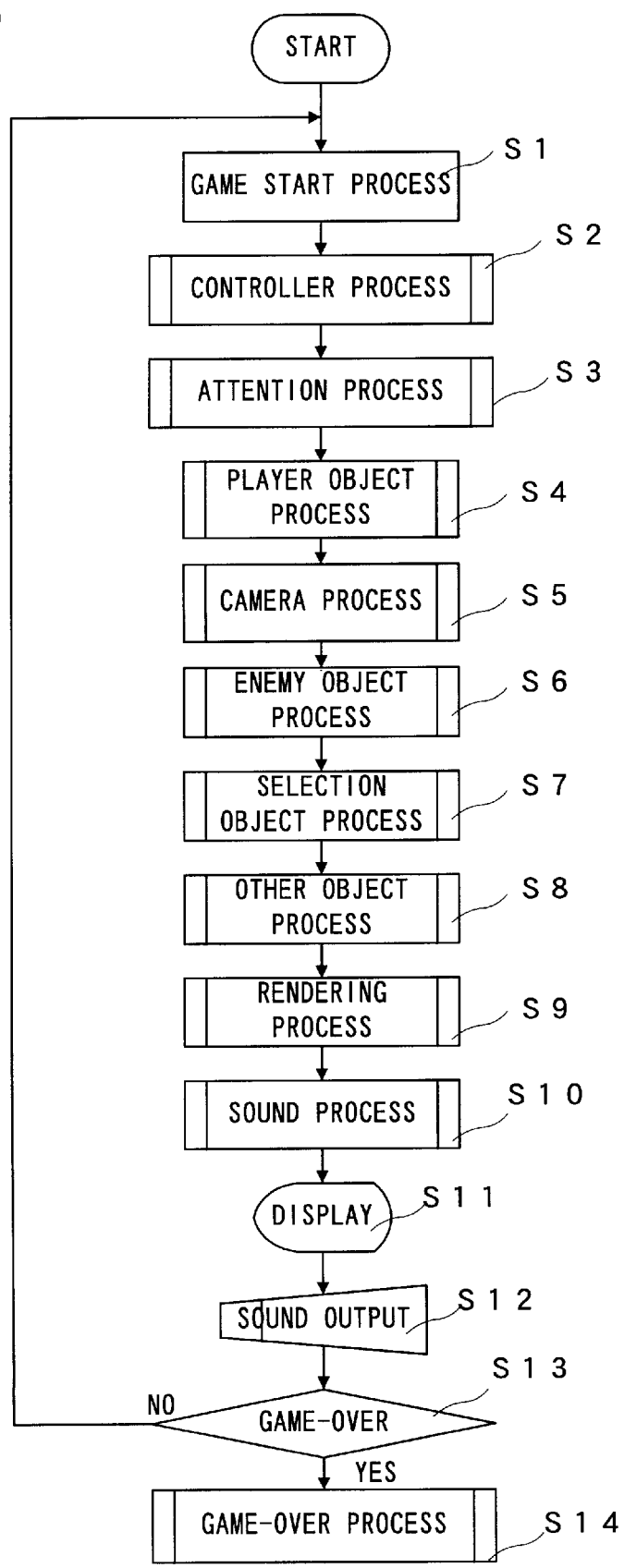
FIG. 8 is a flowchart showing an overall operation of the FIG. 1 embodiment.
Figure 9:
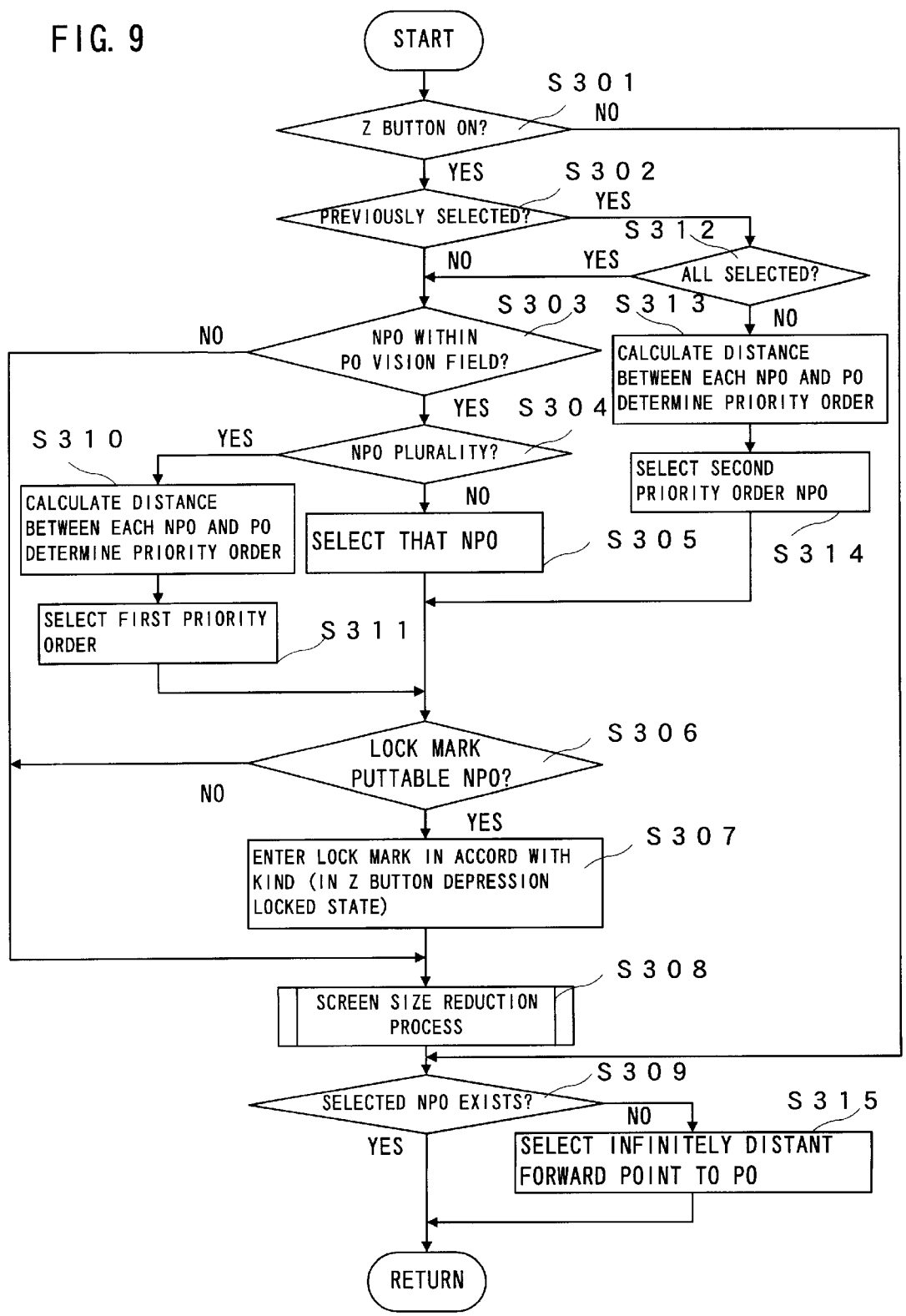
FIG. 9 is a flowchart showing in detail a block process routine in the FIG. 8 embodiment.

FIG. 8 is a main flowchart for the video game system in this embodiment. When a power is turned on, the CPU 11 at a first step S1 sets the video game machine 10 to a predetermined initial state in order to start operation. For example, the CPU 11 transfers a start program among the game programs stored in the program area 22 of the external ROM into the program area 202 of the RAM 14, and sets each parameter to an initial value and executes the steps of FIG. 9 in the order.

The operation of the main flowchart of FIG. 8 is executed, for example, every 1 frame (1/60 second) or every two or three frames, wherein steps S1–S13 are repeatedly executed before the course is cleared. If the game becomes over without success of course clear, a game-over process is effected at a step S14 following the step S13. If course clear is successfully done, the process returns from the step S13 to the step S1.

That is, at the step S1, display is made for a game course screen and/or course choosing screen. However, where a game is started after turning on a power, a first course screen is displayed. If the first course is cleared, a next course is set.

Following the step S1, a controller process is performed at a step S2. In this process, it is detected whether any of the joystick 45, the cross switch 46 and the switches 47A–47Z of the controller 40 is operated or not. Detected data (controller data) on this operating state is read, and the controller data thus read is written into the controller data area 205 of the RAM 14.

At a step S3, an attention process is performed to set the player object paying attention to one or a plurality of non-player object. This lock process step S3 will be explained with greater detail later with reference to FIG. 9.

At a step S4, a process for displaying the player object is performed. This process is basically to vary the position, direction, shape and location of the player object depending upon an operating state of the joystick 45 manipulated by the player and the presence or absence of attacks by an enemy. For example, polygon data to be varied is determined by calculation based on a program transferred from the memory area 22f (FIG. 6) of the external ROM 21, the polygon data of the player object transferred from the memory area 24, and controller data, i.e. an operating state of the joystick 45. A plurality of polygons thus obtained are given colors due to a picture data.

A player object position changing process, i.e. moving process, is controlled by an operating state of the joystick 45. However, in the attention process step S3, when the player object is given attention by a non-player object, the movement is controlled in a manner different from the usual cases. Specifically, explanations will be made later with reference to FIG. 10.

At a step S5, a camera process is performed. For example, calculation is made for a visual point to the respective objects such that a line or field of vision as viewed through a camera finder is in an angle at which the player designates by a joystick 45. The hypothetical camera is controlled in position (visual point) or direction of line of vision basically by the joystick 45. However, when the player object is set giving attention to the non-player object at the aforesaid attention process step S3, control is made in a different way. Specifically, explanations will be made in detail later with reference to FIG. 11.

At a step S6, an enemy object process is performed. This process is effected based on the polygon data of an enemy object transferred from the memory area 22g and the memory area 24 (FIG. 5) and according to a program partly transferred. For example, an enemy object is determined in display position and/or shape by calculating the polygon data such that the enemy object moves to attack the player object or block against its advancing while judging movement of the player object, thereby displaying an enemy object image thus varied. Due to this, the enemy object will move such that it has a certain effect upon the player object.

At a step S7 a selection object process is performed. This process calculates colors, display positions and shapes of selection objects based depending upon a program partly transferred from the memory area 22h and the polygon data of the selection object transferred from the memory area 24 (FIG. 5). This step S7 will be explained in detail later with reference to FIG. 15.

At a step S8 an other object process is performed. This process calculates display positions and shapes of other objects based depending upon a program partly transferred from the memory area 22h and the polygon data of the other objects transferred from the memory area 24 (FIG. 5).

At a step S9, the RSP 122 performs a rendering process. That is, the RCP 12 performs a conversion process (coordinate transformation process and frame memory rendering process), under control of the CPU 11, on image data for displaying a movable object and a stationary object based on the respective texture data for the movable object, such as an enemy object, the player object, etc. and the stationary object, such as a background, memorized in the image data area 201 of the RAM 14. Specifically, colors are put to a plurality of polygons for each of the movable objects and the stationary objects.

At a step S10, the CPU 11 performs a sound process based on sound data, such as of messages, music, effect sounds, etc.

At a step S11, the CPU 11 reads out the image data memorized, as a result of the rendering process by the step S7, in the frame memory area of the RAM 14. This causes the player object and the non-player objects, e.g., the movable objects, the stationary objects and the like, to be displayed on a screen of the display 30 (FIG. 1, FIG. 2).

At a step S12, the sound data which has been sound-processed at the step S8 by the RCP 12 is read out to thereby output sound such as music, effect sound and conversation.

It is determined at a step S13 whether the course has been cleared or not (course clear detection). If the course has not been cleared, it is then determined at a step S14 whether it is game-over or not. If it is not game-over, the process returns to the step S2 to repeat the steps S1–S14 until a condition of game-over is detected. If detecting a game-over condition, i.e., a number of mistakes permitted for a player reaches a predetermined number of times or the life of the player object is consumed by a predetermined amount, then a game-over process is carried out at a next step S14 to opt game continuation, backup data saving, or the like.

Incidentally, if a course clear condition (e.g., defeated a boss, etc.) is detected at the step S13, a course clear process is carried out and the process returns to the step S1. With reference FIG. 9, at a first step S301 the CPU (FIG. 2) makes reference to the controller data area 205 shown in FIG. 6, and determines whether the Z button (switch) 47Z was turned on or not. If "YES" is determined at this step S301, the CPU 11 at a next step S302 makes reference to an NPO selecting flag F1 in the register flag area 206 (FIG. 6), and determines whether the attention non-player object (NPO) was previously selected or not. This flag F1, if at "1", represents that one or two or more non-player objects were previously selected, that is, an attention process was performed. The flag F1, if at "0", represents that no attention non-player objects were previously selected. Accordingly, where the Z button 47Z is pressed on for the first time, "NO" is determined at this step S302, and the process advances to a next step S303.

At the step S303, the CPU 11 makes reference to the image data area 203 (FIG. 6, FIG. 7), and determines whether there exists a non-player object within the field of vision of the player object. The field of vision of the player object is given in a range of +60° to −60° provided that the direct front of the player object is taken 0°. Accordingly, it is determined whether or not a non-player object (enemy object or stationary object or other objects) exists within the range of +60° to −60° with respect to the direct front of the player object. If "YES" is determined at this step S303, it is then determined at a next step S304 whether a plurality of non-player objects were detected or not. If "NO" is determined at the step S304, that is, if one non-player object is detected within the field of vision of the player object, at a step S305 the one non-player object is selected as an attention non-player object.

If an attention non-player object is selected at the step S305, then the CPU 11 at a step S306 determines whether the attention non-player object is a non-player object that can be given a lock mark LM (FIG. 12, FIG. 13) or not. For example, where the non-player object is an enemy object, this object can be given a lock mark. Where the non-player object is a stationary object (e.g., an item, treasure chest, etc. required for the game), a lock mark can also be given to the object. However, the non-player objects other than these cannot be given a lock mark. Accordingly, at this step S306 the determination is on whether the attention non-player object is an enemy object, a stationary object or other non-player objects than these objects. When the attention non-player object is a non-player object to which a lock mark can be given, a lock mark LM (FIG. 12, FIG. 13) in a color corresponding to a kind of the relevant non-player object is entered to a display list area 201 (FIG. 6). It is noted that in this embodiment the attention non-player object is given a "red" lock mark where it is an enemy object, and a "yellow" lock mark when it is another non-player object than that object. As long as the Z button 47Z is being depressed, the lock mark is displayed as in a locked state. Here, the "locked state" refers to a state that the player object keeps paying attention to the non-player object. When in a locked state, the CPU 11 sets a lock flag F2 of the RAM 14 at "1".

Figure 12:
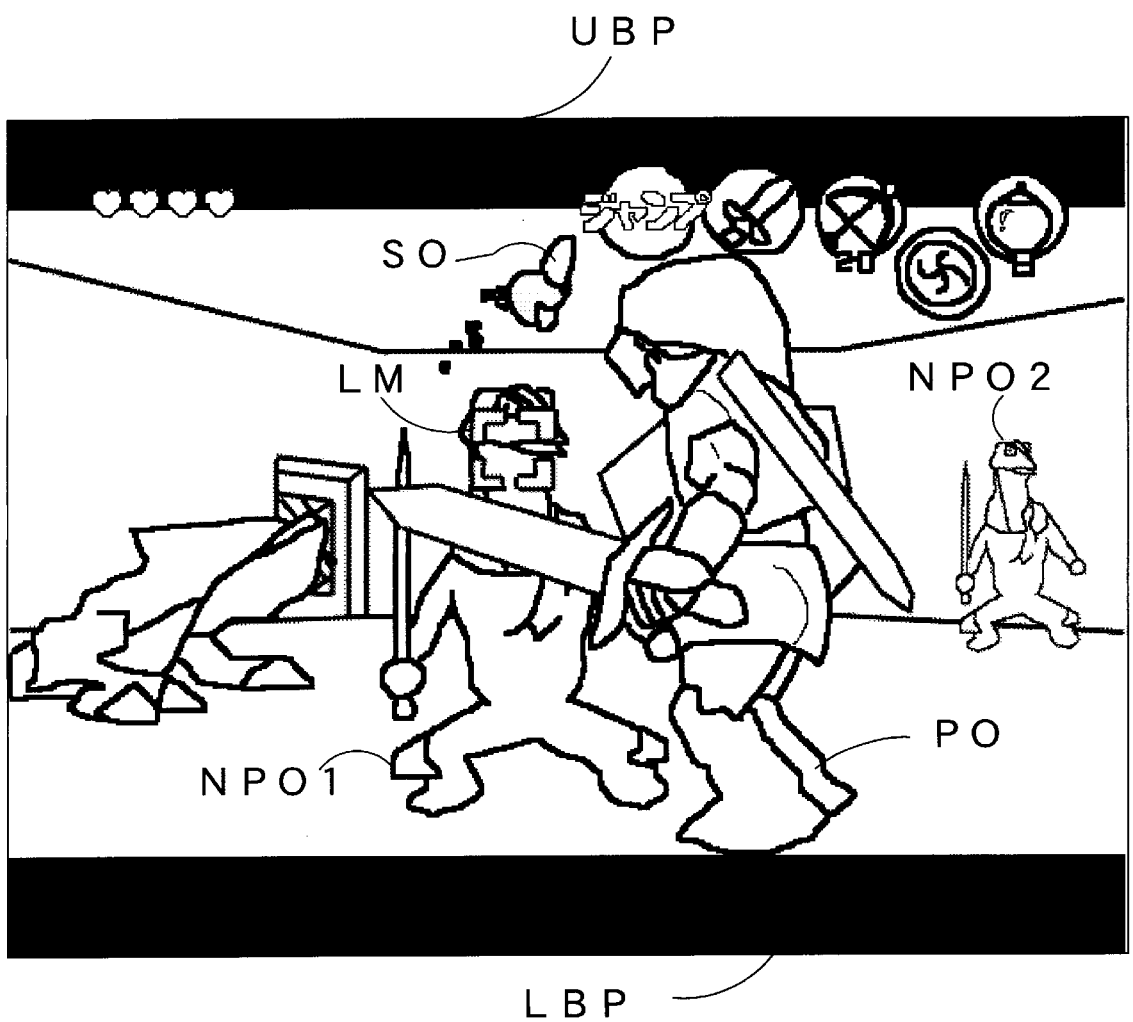
FIG. 12 is an illustrative view showing one example of images to be displayed according to the FIG. 10 embodiment and FIG. 11 embodiment.
Figure 13:
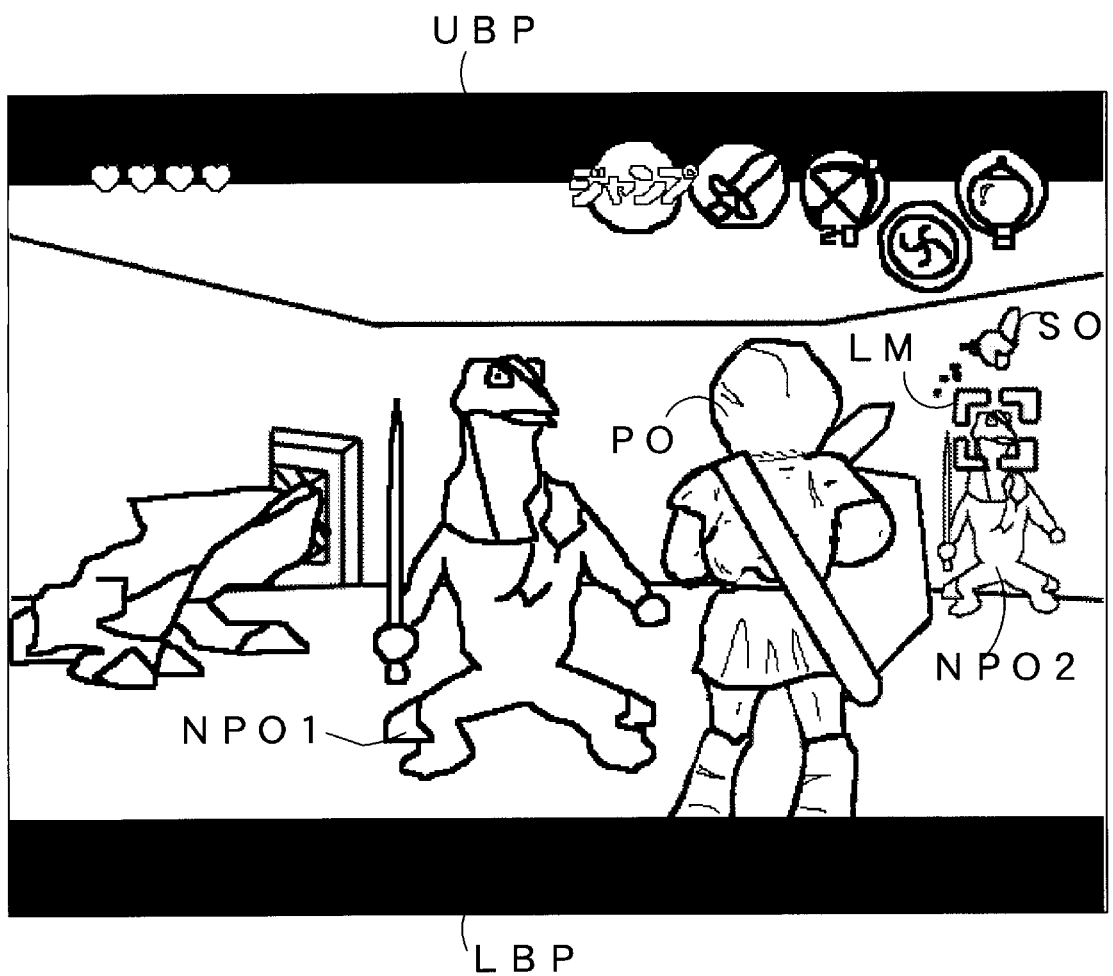
FIG. 13 is an illustrative view showing one example of the images according to the FIG. 10 embodiment and the FIG. 11 embodiment.

At a step S308 the display area is decreased in order to recognize the player that the player object is set giving attention to the non-player object, i.e., that an attention process has been done. Specifically, non-display areas (blanking areas) UBP and LBP are provided at top and bottom of the display screen, as shown in FIG. 12 and FIG. 13. Accordingly, when such area-reduction display is effected, the player can visually recognize that an attention process has been made through the Z button 47Z. In order to provide such blanking portions UBP and LBP, polygons may be inserted between each object and an icon (as displayed at above locations in FIG. 12 and FIG. 13) and affixed with black textures. Otherwise, the image signals may be gated at that portions. It is determined at a next step S309 whether there exists the selected attention object or not. If "YES" is determined at this step S309, the aforesaid NPO selecting flag F1 (FIG. 6) is set to "1".

Incidentally, when a plurality of non-player objects are detected within the field of vision of the player object at the step S304, calculations are made at a step S310 for a straight line distance between each non-player object and the player object to thereby determine a higher priority order of the non-player objects having a shorter straight line distance. At a step S311 the non-player object given a first priority is selected as an attention non-player object, and the process advances to a forward step S306. That is, where there is a plurality of non-player objects within the field of vision of the player object, the non-player object positioned closest to the player object is selected as an attention non-player object.

Further, when the Z button 47Z is pressed on, if the NPO selecting flag F1 is set at "1", that is, one or two or more attention non-player objects have already been selected, the determination at the step S302 will be "YES", and the process advances to the step S312. It is determined at this step S312 whether or not selections have been made for all the non-player objects existing on the display screen. That is, at this step S312 it is determined whether the attention process has been completed for all the non-player objects including not only the non-player objects being displayed on the display screen but also the non-player objects not being displayed on the display screen.

If "NO" is determined at the step S312, determinations are made on the priority orders according to the straight line distance between each non-player object and the player object, similarly to the aforementioned step S310. At a next step S314 the non-player object given a second priority order is selected as an attention non-player object, and the process advances to a step S306.

Because steps S313 and S314 are concerned with all the non-player objects except for the non-player objects existing within the field of vision of the player object and already selected as the attention non-player objects, the selections of attention non-player objects at a second time and later are not concerned with whether to exist within the field of vision of the player object. Accordingly, where for example a plurality of non-player objects exist within the field of vision of the player object and one or more non-player objects are present outside the field of vision of the player object, upon a first operation of the Z button a non-player object positioned closest in the field of vision is selected as an attention non-player object. Upon operations of the Z button 47Z at a second time and later, attention determinations are for the non-player objects present within the field of vision but left unselected as well as the non-player objects existing outside the field of vision. Among these non-player objects, a closest non-player object is given a second priority order.

If "NO" is determined at a step S309, a forward predetermined point located infinitely distant from the player object is considered as a non-player object at a step S315, and this point is selected. Accordingly, when the Z button 47Z is held on, the player object is kept locked at that point.

As another embodiment, where the Z button 47Z is kept on over a predetermined time period (e.g., time period of several tens of frames in television scan), it is possible to keep the player object locked at that point even if the Z button 47Z is returned off. In such a case, the lock may be released when the Z button 47Z is again pressed on.

Figure 10:
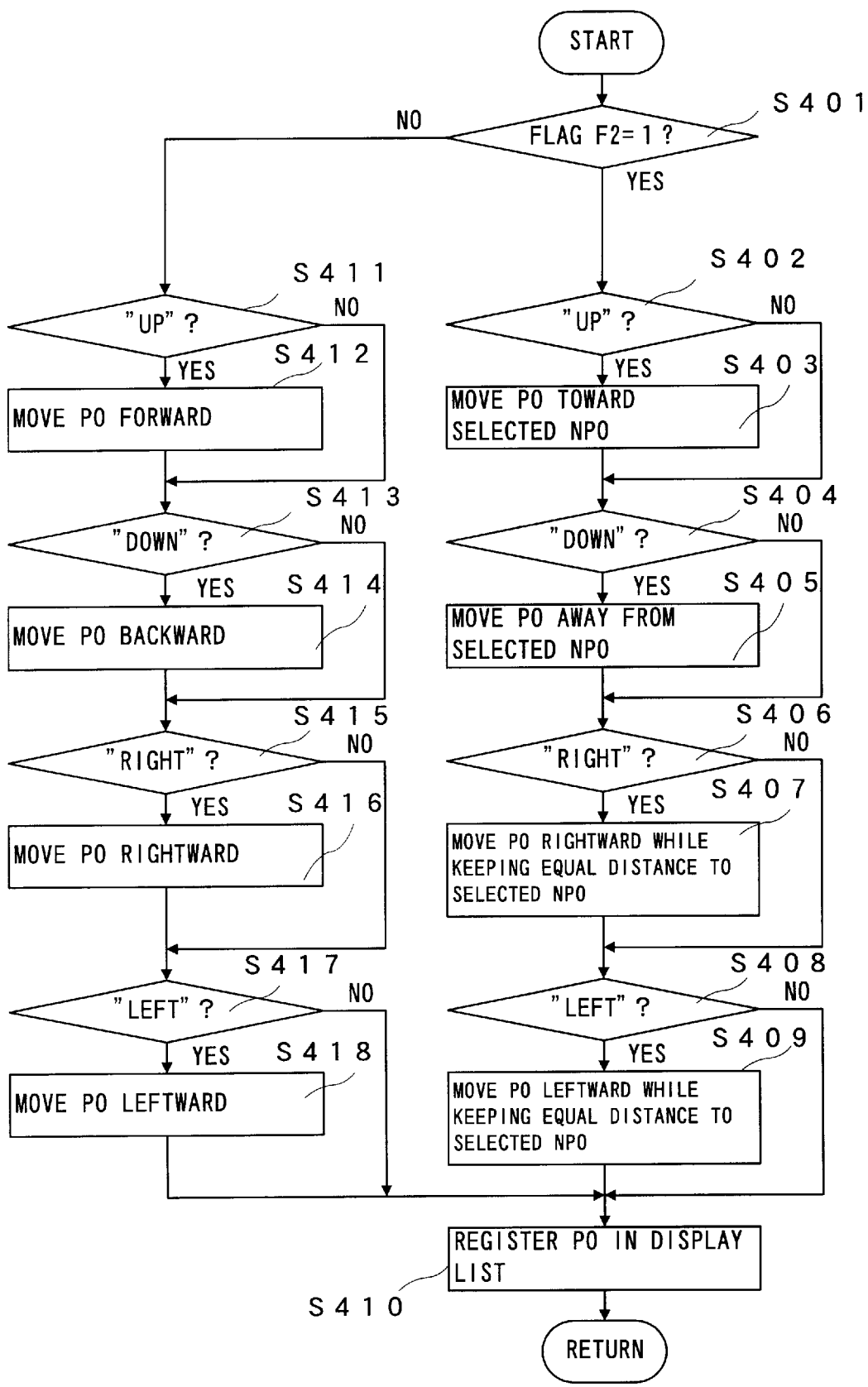
FIG. 10 is an illustrative view showing in detail a player object process routine in the FIG. 8 embodiment.

Now referring to FIG. 10, at a first step S401 in the player object process step S4 (FIG. 8), the CPU 11 makes reference to the lock flag F2 of the RAM 14 to thereby determine whether the attention non-player object is locked or not. If "YES" is determined at this step S401, that is, if the attention non-player object is in a locked state, the CPU 11 at a next step S402 determines whether there is an instruction of an "UP" direction in the analog joystick 45 or the cross switch 46. That is, whether there is an instruction to move the player object in the "UP" direction or not is determined. If "YES", the CPU 11 at a step S403 moves the player object in a direction toward the selected attention non-player object. Accordingly, the player object is moved to decrease the distance to the attention non-player object while directly facing the attention non-player object (enemy object).

Where "DOWN" is selected by the analog joystick 45 or the cross key 46, the player object is moved by steps S404 and S405 in a direction away from the selected attention non-player object. That is, when "DOWN" is instructed, the player object is moved in a direction away from the attention non-player object while facing the attention non-player object.

Figure 15:
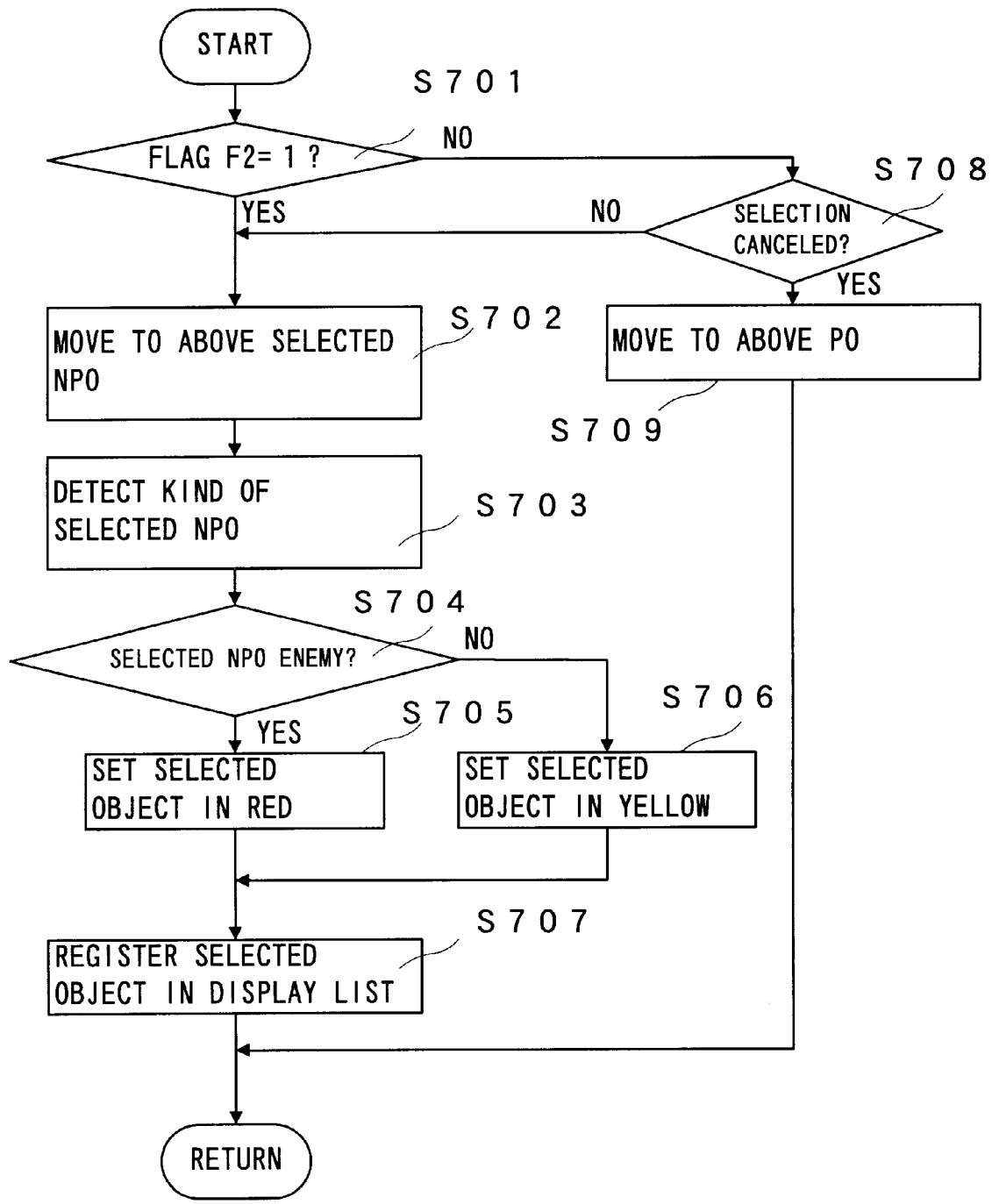
FIG. 15 is an illustrative view showing in detail a selection object process routine in the FIG. 8 embodiment.
Figure 16:
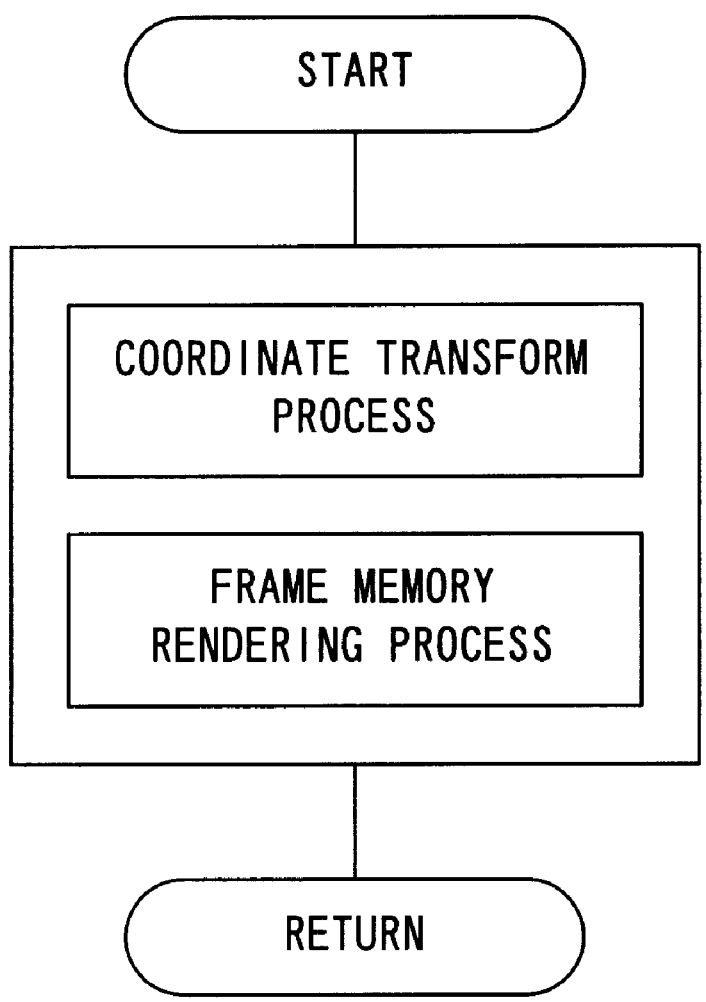
FIG. 16 is an illustrative view showing in detail a rendering process routine in the FIG. 8 embodiment.

When a direction of "RIGHT" is instructed by the analog joystick 45 or the cross key 46, the CPU 11 at steps S406 and S407 moves the player object to rightward while keeping constant the distance between the player object and the attention non-player object. In this case, the player object is moved on a circle having as center the attention non-player object, as shown in FIG. 15. Incidentally, if the player object is paying attention to the aforesaid "infinitely distant forward point", when "RIGHT" is instructed by the analog joystick 45 or the cross key 46, the player object is moved rightward while maintaining equal the distance to that point. That is, in this case, the player object performs parallel movement in the rightward direction while being directed front on the display screen.

Figure 14:
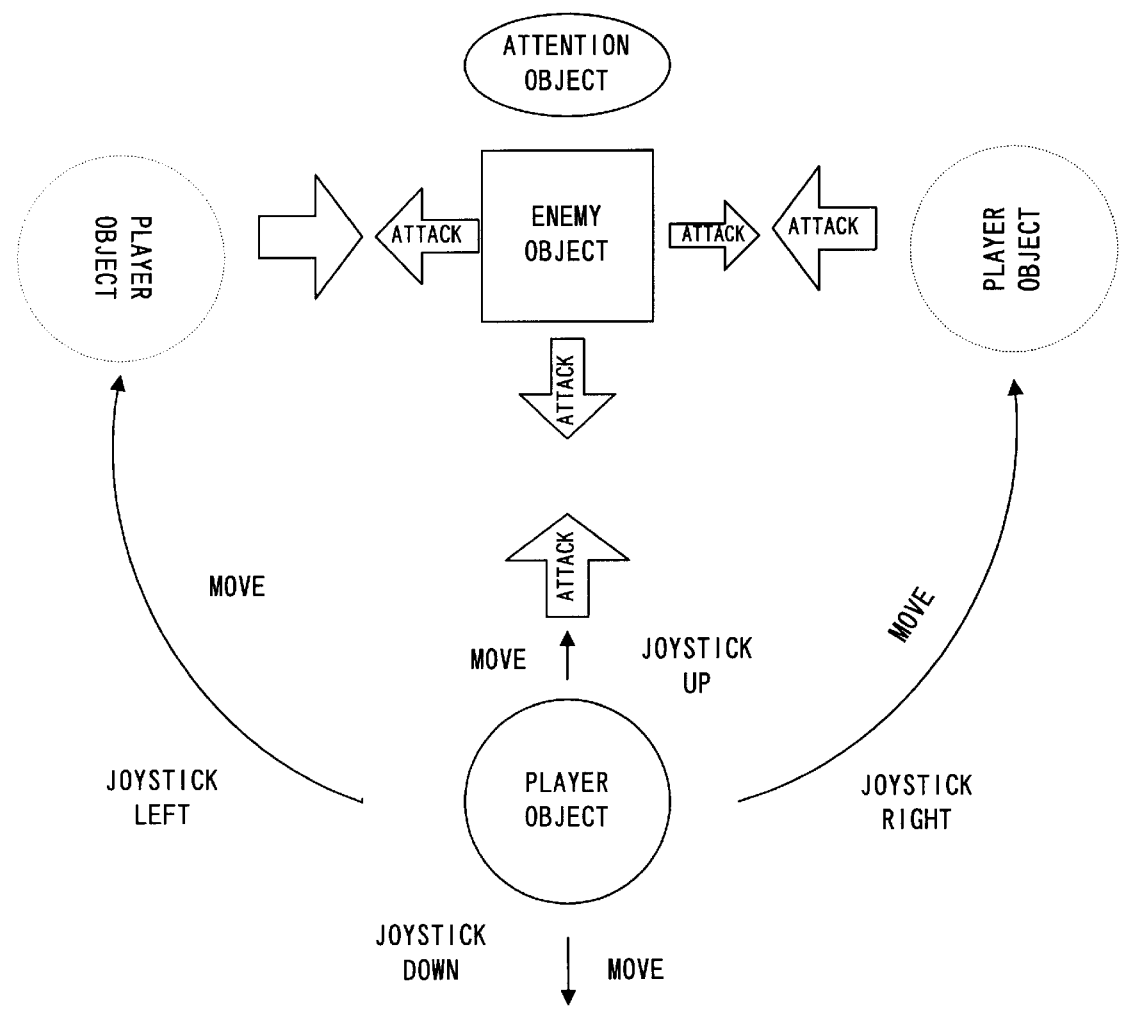
FIG. 14 is an illustrative view showing movement in position and photographing direction of a hypothetical camera according to the FIG. 11 embodiment.

When "LEFT" is instructed by the analog joystick 45 or the cross key 46, the player object is moved leftward on a circle having as a center the attention non-player object at steps S408 and S409, as shown in FIG. 14. That is, the player object is moved leftward while maintaining constant the distance to the attention non-player object. Incidentally, where the player object is giving attention to the "infinitely distant forward point", if "LEFT" is instructed, the player object is moved leftward while keeping equal the distance to that point. That is, in this case, the player object performs a leftward parallel movement with directed frontward on display screen.

The display position of the player object, etc. are registered in the display list area 201 (FIG. 6).

Incidentally, where in FIG. 10 the non-player object is not locked, the player object is moved, as shown by the steps S411–S418, in a direction instructed by the analog joystick 45 or the cross key 46.

Figure 11:
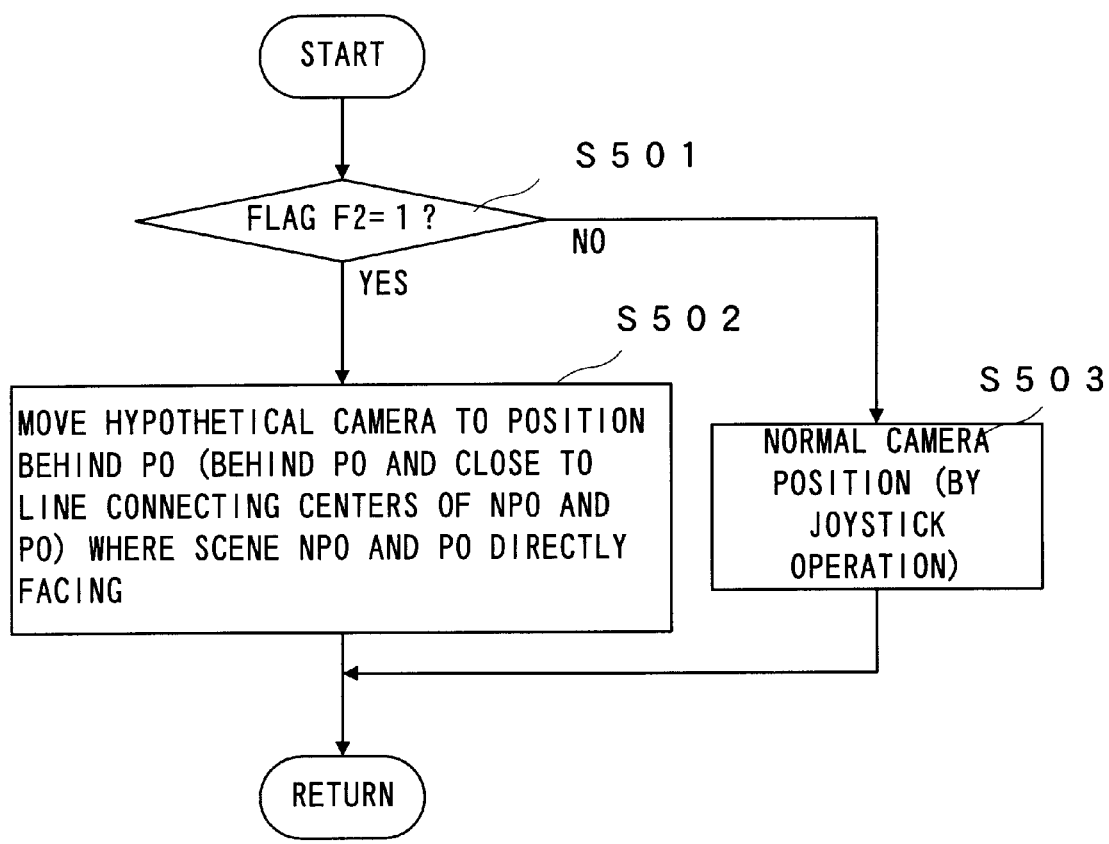
FIG. 11 is an illustrative view showing in detail a camera process routine in the FIG. 8 embodiment.

Referring to FIG. 11, the camera process step S5 (FIG. 8) will be explained. At a first step S501 the CPU 11 determines whether the non-player object is locked or not, that is, whether the lock flag F2 is in setting or not. If "YES" is determined at this step S501, the CPU 11 at a step S502 moves a hypothetical camera (not shown) to a position at which it is possible to photograph the state that the non-player object and the player object are directly facing to each other. Specifically, the hypothetical camera is moved to a position behind the player object and close to a line (not on the line) connecting between the respective centers of the attention non-player object and the player object. The hypothetical camera is set with its line of vision directed to photograph the attention non-player object. Accordingly, if the Z button 47Z is switched on, the hypothetical camera is shifted in position and photographing direction so as to photograph from the behind of the player object PO the state that the player object PO faces the non-player object NPO1 or NPO2, as shown in FIG. 12 or FIG. 13. Accordingly, if the analog joystick 45 or the cross key 46 is operated in this state, the player object as shown in FIG. 14 can be moved while keeping the state that the player object directly faces the attention non-player object, according to the flowchart of FIG. 10.

At a first step S701 of the selection object process step S7 (FIG. 8) shown in FIG. 15, the CPU 11 determines whether the lock flag F2 is at "1" or not. When the lock flag F2 is "1", the CPU 11 moves a selection object SO (FIG. 12 or FIG. 13) to the above of the attention non-player object, i.e., NPO1 in FIG. 12 or NPO2 in FIG. 13. That is, at this step S702 the selection object SO is moved to the above of the attention non-player object based depending upon the program data in the selection object program area 22 shown in FIG. 5 and the selection object image data area 203e (FIG. 7) of the image data area 203. At a next step S703 the attention non-player object being selected at that time is detected of its kind. It is determined at a step S704 whether the attention non-player object is an enemy object or not. That is, although the non-player objects selectable as an attention non-player object include a stationary object besides an enemy object as stated before, it is herein determined whether or not the attention non-player object is an enemy object or a non-player object other than that. If it is an enemy object, the CPU 11 at a step S705 sets a color for the selection object SO in "red" through the RDP 123 (FIG. 2). If it is a non-player object other than an enemy object, the selection object SO is set in yellow at a step S706. After executing the step S705 or S706, the CPU registers the selection object SO to the display list area 201.

It is noted that, when the attention non-player object is released from its locked state at a step S708, the selection object is displayed at a step S709 at above the player object.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A video game apparatus coupled to a display, comprising:

a first image data generator for generating first image data to display a player object;

a second image data generator for generating second image data to display non-player objects;

an image processor for supplying an image signal to said display according to at least one of said first image data and said second image data in order to display, in a virtual three-dimension space on said display, at least one of the player object and the non-player object photographed through a hypothetical camera;

a controller including a first operation member to instruct a moving direction of the player object and a second operating member that is operated when attention is to be paid by the player object to the non-player object;

a non-player object detector for detecting whether the non-player object exists or not, in response to an operation of said second operating member;

A selector for selecting as an attention non-player object the non-player object detected by said non-player object detector; and a camera controller for changing the position of said hypothetical camera such that photographing can be made on the player object directly facing the attention non-player object selected by said selector.

2. A video game apparatus according to claim 1, further comprising a priority orderer for giving predetermined priority orders to respective non-player objects when said non-player object detector detects a plurality of non-player objects, wherein said selector first selects as the attention non-player object a non-player object having a highest priority order.

3. A video game apparatus according to claim 2, wherein, when said non-player object detector detects one non-player object within a field of vision of the player object, said priority orderer gives a first priority order to the one non-player object.

4. A video game apparatus according to claim 3, wherein, when said non-player object detector detects a non-player object outside the field of vision of the player object, said priority orderer gives a second priority order to the non-player object.

5. A video game apparatus according to claim 2, wherein, when said non-player object detector detects a plurality of non-player objects within a field of vision of the player object, said priority orderer gives a first priority order to a particular one of the non-player objects.

6. A video game apparatus according to claim 5, wherein, when said non-player object detector detects one or a plurality of non-player objects outside the field of vision of the player object, said priority orderer gives priority orders subsequent to the priority order of the non-player object within the field of vision to the non-player objects outside the field of vision.

7. A video game apparatus according to claim 2, wherein said priority orderer determines priority orders depending upon a distance between each of the plurality of non-player objects and the player object.

8. A video game apparatus according to claim 2, wherein said selector selects different non-player objects as attention non-player objects according to the priority orders, each time said second operating member is operated.

9. A video game apparatus according to claim 1, wherein said camera controller moves said hypothetical camera so as to photograph, from the behind of the player object, the attention non-player object and the player object.

10. A video game apparatus according to claim 1, further comprising an attention lock for causing the player object to continuously pay attention to the attention non-player object when said second operating member is continuously operated.

11. A video game apparatus according to claim 10, wherein said first operating member includes a direction indicator by which at least four directions, including "UP", "DOWN", "RIGHT" and "LEFT" can be indicated, and further comprising a first object mover for moving the player object in a direction toward the attention non-player object if the "UP" direction is indicated by said direction indicator when the player object is locked to the attention non-player object by said attention lock.

12. A video game apparatus according to claim 10, wherein said first operating member includes a direction indicator by which at least four directions, including "UP", "DOWN", "RIGHT" and "LEFT" can be indicated, and further comprising a second object mover for moving the player object in a direction away from the attention non-player object if the "DOWN" direction is indicated by said direction indicator when the player object is locked to the attention non-player object by said attention lock.

13. A video game apparatus according to claim 10, wherein said first operating member includes a direction indicator by which at least four directions, including "UP", "DOWN", "RIGHT" and "LEFT" can be indicated, and further comprising a third object mover for moving the player object in a right direction while keeping constant a distance between the player object and the attention non-player object if the "RIGHT" direction is indicated by said direction indicator when the player object is locked to the attention non-player object by said attention lock.

14. A video game apparatus according to claim 10, wherein said first operating member includes a direction indicator by which at least four, including "UP", "DOWN", "RIGHT" and "LEFT" can be indicated, and further comprising a fourth object mover for moving the player object in a left direction while keeping constant a distance between the player object and the attention non-player object if the "LEFT" direction is indicated by said direction indicator when the player object is locked to the attention non-player object by the attention lock.

15. A video game apparatus according to claim 10, further comprising a selection object image data generator for generating selection object image data, wherein said image processor supplies to said display an image signal to display the selection object at a correlating position on said display to the attention non-player object when said attention lock causes the attention object to be locked.

16. A video game apparatus according to claim 15, further comprising a kind discriminator for discriminating a kind of the attention non-player object, wherein said selection object image data generator generates selection object image data in a different color depending upon the kind.

17. A video game apparatus according to claim 10, further comprising a visual lock indicator for a non-player object locked by said attention lock.

18. A video game apparatus according to claim 17, wherein said visual lock indicator has a particular color depending upon the kind of the selected non-player object.

19. A video game apparatus according to claim 1, further comprising a screen reducer for reducing a display range of said display when said selector selects the attention non-player object.

20. A video game apparatus according to claim 1, wherein said selector selects an infinitely distant forward point of the player object when said non-player object detector cannot detect a non-player object.

21. A video game apparatus according to claim 20, further comprising an attention lock for causing the player object to continuously pay attention to a point when said second operating member is continuously operated.

22. A video game apparatus according to claim 21, wherein said first operating member includes a direction indicator by which at least four directions, including "UP", "DOWN", "RIGHT" and "LEFT" can be indicated, and further comprising an object mover for moving the player object in a right direction or left direction while keeping constant a distance between the player object and the point if the "RIGHT" or "LEFT" direction is indicated by said direction indicator when the player object is locked to the attention non-player object by said attention lock.

23. A method for controlling a video game apparatus coupled to a display and a controller means including a first operating member to instruct a moving direction of a player object and a second operating member that is operated when attention is to be paid by the player object to a non-player object, comprising the steps of:

(a) generating first image data to display the player object;

(b) generating second image data to display the non-player object;

(c) supplying an image signal to said display, according to at least one of the first image data and the second image data, to display, in a three-dimension virtual space on said display, at least of one of the player object and the non-player object photographed through a hypothetical camera;

(d) detecting whether or not the non-player object exists, in response to an operation of said second operating member;

(e) selecting a detected non-player object as an attention non-player object; and (f) changing a position of said hypothetical camera so that the player object directly facing the attention non-player object can be photographed.

24. A controlling method according to claim 23, further comprising a step (g) wherein, when a plurality of non-player objects are detected at the step (d), predetermined priority orders are given to the respective non-player objects, wherein the step (e) first selects a non-player object having a highest priority order as the attention non-player object.

25. A controlling method according to claim 23, further comprising a step (h) of causing the player object to continuously pay attention to the attention non-player object when said second operating member is continuously operation for at least a predetermined time period.

26. A controlling method according to claim 23, further comprising a step (i) of reducing a display range on said display when the attention non-player object is selected at the step (e).

27. A memory medium to be detachably attached to a video game apparatus provided with an image processor for supplying an image signal to a display, according to at least one of first image data and second image data, to display, in a virtual three-dimension space on said display, at least one of a player object and a non-player object, and a controller including a first operating member to instruct a moving direction of the player object and a second operating member operated when the player object is set paying attention to the non-player object, said memory medium memorizing a program for said image processor, comprising:

a first image data generating program for generating the first image data to display the player object;

a second image data generating program for generating the second image data to display the non-player object;

a non-player object detecting program for detecting whether or not the non-player object exists in response to an operation of said second operating member;

a selection program for selecting, as an attention non-player object, the non-player object detected by said non-player object detecting program; and a camera control program for changing a position of hypothetical camera so that the player object directly facing the attention non-player object selected by said selection program can be photographed.

28. A memory medium according to claim 27, further comprising a priority order giving program for giving predetermined priority orders to the respective non-player objects when said non-player object detecting program detects a plurality of non-player objects, wherein said selection program first selects as the attention non-player object a non-player object having a highest priority order.

29. A memory medium according to claim 27, further comprising a lock program for causing the player object to continuously pay attention to the attention non-player object when said second operating member is continuously operated for at least a predetermined time period.

30. A memory medium according to claim 27, further comprising a screen reducing program for reducing a display range on said display when the attention non-player object is selected according to said selection program.

31. A video game apparatus coupled to a display, comprising:
   a first image data generating means for generating first image data to display a player object;
   a second image data generating means for generating second image data to display non-player objects;
   an image processing means for supplying an image signal to said display according to at least one of said first image data and said second image data in order to display, in a virtual three-dimension space on said display, at least one of the player object and the non-player object photographed through a hypothetical camera;
   a controller means including a first operating means to instruct a moving direction of the player object and a second operating means that is operated when attention is to be paid by the player object to the non-player object;
   a non-player object detecting means for detecting whether the non-player object exists or not, in response to an operation of said second operating means;
   a selecting means for selecting as an attention non-player object the non-player object detected by said non-player object detecting means; and
   a camera control means for changing in position of said hypothetical camera such that photographing can be made on the layer object directly facing the attention non-player object selected by said selecting means.

32. A video game apparatus according to claim 31, further comprising a priority order giving means for giving predetermined priority orders to the respective non-player objects when said non-player object detecting means detects a plurality of non-player objects, wherein said selecting means first selects as the attention non-player object a non-player object having a highest priority order.

33. A video game according to claim 32, wherein, when said non-player object detecting means detects one non-player object within a field of vision of the player object, said priority order giving means gives a first priority order to the one non-player object.

34. A video game apparatus according to claim 33, wherein, when said non-player object detecting means detects a non-player object outside the field of vision of the player object, said priority order giving means gives a second priority order to the non-player object.

35. A video game apparatus according to claim 34, wherein, when said non-player object detecting means detects a plurality of non-player objects within a field of vision of the player object, said priority giving means gives a first priority order to particular one of the plurality of non-player objects.

36. A video game apparatus according to claim 35, wherein, when said non-player object detecting means detects one or a plurality of non-player objects outside the field of vision of the player object, said priority order giving means gives priority orders subsequent to the priority order of the non-player object within the field of vision to the non-player objects outside the field of vision.

37. A video game apparatus according to claim 32, wherein said priority order giving means determines priority orders depending upon a distance between each of the plurality of non-player objects and the player object.

38. A video game apparatus according to claim 32, wherein said selecting means selects different non-player objects as attention non-player objects according to the priority orders, each time said second operating means is operated.

39. A video game apparatus according to claim 31, wherein said camera control means moves said hypothetical camera so as to photograph, from the behind of the player object, the attention non-player object and the player object.

40. A video game apparatus according to claim 31, further comprising a lock means for causing the player object to continuously pay attention to the attention non-player object when said second operating means is continuously operated.

41. A video game apparatus according to claim 40, wherein said first operating means includes a direction instructing means by which at least four directions, including "UP", "DOWN", "RIGHT" and "LEFT" can be instructed, and further comprising a first object moving means for moving the player object in a direction toward the attention non-player object if the "UP" direction is instructed by said direction instructing means when the player object is locked to the attention non-player object by said lock means.

42. A video game apparatus according to claim 40, wherein said first operating means includes a direction instructing means by which at least four directions, including "UP", "DOWN", "RIGHT" and "LEFT" can be instructed, and further comprising a second object moving means for moving the player object in a direction away from the attention non-player object if the "DOWN" direction is instructed by said direction instructing means when the player object is locked to the attention non-player object by said lock means.

43. A video game apparatus according to claim 40, wherein said first operating means includes a direction instructing means by which at least four directions, including "UP", "DOWN", "RIGHT" and "LEFT" can be instructed, and further comprising a third object moving means for moving the player object in a right direction while keeping constant a distance between the player object and the attention non-player object if the "RIGHT" direction is instructed by said direction instructing means when the player object is locked to the attention non-player object by said lock means.

44. A video game apparatus according to claim 40, wherein said first operating means includes a direction instructing means by which at least four directions, including "UP", "DOWN", "RIGHT" and "LEFT" can be instructed, and further comprising a fourth object moving means for moving the player object in a left direction while keeping constant a distance between the player object and the attention non-player object if the "LEFT" direction is instructed by said direction instructing means when the player object is locked to the attention non-player object by the lock means.

45. A video game apparatus according to claim 40, further comprising a selection object image data generating means for generating selection object image data, wherein said image processing means supplies to said display an image signal to display the selection object at a correlating position on said display to the attention non-player object when said lock means causes the attention object to be locked.

46. A video game apparatus according to claim 45, further comprising a kind discriminating means for discriminating a kind of the attention non-player object, wherein said selection object image data generating means generates selection object image data in a different color depending upon the kind.

47. A video game apparatus according to claim 40, further comprising a lock mark giving means for giving a lock mark to a non-player object locked by said lock means.

48. A video game apparatus according to claim 47, wherein said lock mark giving means gives a lock mark in a color depending upon the kind of the selected non-player object.

49. A video game apparatus according to claim 31, further comprising a screen reducing means for reducing a display range of said display when said selecting means selects the attention non-player object.

50. A video game apparatus according to claim 31, wherein said selecting means selects an infinitely distant forward point of the player object when said non-player object detecting means cannot detect a non-player object.

51. A video game apparatus according to claim 50, further comprising a lock means for causing the player object to continuously pay attention to the point when said second operating means is continuously operated.

52. A video game apparatus according to claim 51, wherein said first operating means includes a direction instructing means by which at least four directions, including "UP", "DOWN", "RIGHT" and "LEFT" can be instructed, and further comprising an object moving means for moving the player object in a right direction or left direction while keeping constant a distance between the player object and the point if the "RIGHT" or "LEFT" direction is instructed by said direction instructing means when the player object is locked to the attention non-player object by said lock means.

* * * * *